United States Patent
Kamp (10) Patent No.: US 8,736,122 B2
(45) Date of Patent: May 27, 2014

(54) INDUCTION MOTOR VENTILATED HEAT SHIELD FOR BEARINGS

(75) Inventor: Timothy Kamp, Cincinnati, OH (US)

(73) Assignee: Siemens Industry, Inc., Alpharetta, GA (US)

( * ) Notice: Subject to any disclaimer, the term of this patent is extended or adjusted under 35 U.S.C. 154(b) by 1170 days.

(21) Appl. No.: 12/566,290

(22) Filed: Sep. 24, 2009

(65) Prior Publication Data

US 2011/0068644 A1 Mar. 24, 2011

(51) Int. Cl.
*H02K 5/16* (2006.01)
*H02K 9/00* (2006.01)
*H02K 5/10* (2006.01)

(52) U.S. Cl.
USPC ............ 310/90; 310/58; 310/85; 310/86

(58) Field of Classification Search
USPC ........ 415/111; 310/425, 58, 60 R, 85, 86, 89, 310/90
See application file for complete search history.

(56) References Cited

U.S. PATENT DOCUMENTS

| | | | |
|---|---|---|---|
| 3,062,976 A * | 11/1962 | Wiley | 310/60 R |
| 3,407,317 A * | 10/1968 | Honsinger | 310/58 |
| 3,527,970 A | 9/1970 | Wightman et al. | |
| 3,610,976 A | 10/1971 | Wightman | |
| 3,684,906 A | 8/1972 | Lenz | |
| 3,761,748 A | 9/1973 | Baumann et al. | |
| 3,870,907 A | 3/1975 | Hoffman | |
| 4,268,767 A | 5/1981 | Domitrovic et al. | |
| 4,742,257 A * | 5/1988 | Carpenter | 310/62 |
| 6,887,049 B2 * | 5/2005 | Chen | 417/423.7 |
| 6,914,355 B2 | 7/2005 | Cardenas et al. | |
| 2008/0078384 A1 * | 4/2008 | Messenger et al. | 128/203.12 |

* cited by examiner

*Primary Examiner* — Tran Nguyen
*Assistant Examiner* — Jose Gonzalez Quinones (57) ABSTRACT

A dynamoelectric machine, such as a totally enclosed fan cooled (TEFC) induction motor has a double-wall bearing housing heat shield that envelops and thermally isolates the bearing housing from the rest of the motor housing interior. The shield defines an air channel between the shield outer and inner walls. Optionally the air channel may be constructed to enable circulating air flow through a shield intake in communication with an air flow source, such as air ducted from the TEFC motor axial cooling fan. The air channel also defines an exhaust. Air flow within the air channel transfers heat out of the motor housing, lowering bearing housing operating temperature. Air flow rate may be varied in response to motor operational parameters.

15 Claims, 7 Drawing Sheets

INDUCTION MOTOR VENTILATED HEAT SHIELD FOR BEARINGS

BACKGROUND OF THE DISCLOSURE

1. Field of the Invention

The invention relates to shaft bearing heat shields for electrodynamic machines, including electric induction motors. A specific exemplary application of the present invention is directed to bearing heat shields for totally enclosed fan cooled (TEFC) motors.

2. Description of the Prior Art

Induction motors generate heat as they convert electromagnetic energy to kinetic energy necessary to rotate the motor shaft under an applied load. Totally enclosed fan cooled (TEFC) motors have sealed housings. Heat is transferred from the internal rotor and stator to peripheral cooling fins on the motor housing. The motor drive shaft projects from one axial end of the motor. The other end of the shaft incorporates a cooling fan surrounded by a housing/shroud structure that directs air axially along the motor circumference, in order to increase convective heat transfer from the motor to atmosphere. While the driven fan assists heat transfer from the rotor and stator assemblies within the motor, a potential area for heat buildup is the drive side bearing opposite the driven fan. The drive side bearing has no direct access to driven fan cooling air.

In the past, one solution to provide cooling air to the drive bearing has been to construct the motor with another fan on the drive side. Such a construction adds additional length and complexity to the motor.

Another solution has been to add sealed cooling ducts and baffles within the motor housing and along its circumferential periphery in order to direct cooling air flow from the fan directly into the motor housing. This solution attempts to lower motor housing temperature in proximity to the drive side bearing. The drive side bearing, however, is still exposed to heat generated by the motor. In effect this solution attempts to introduce cooling air in proximity to the bearing housing, in order to enhance convective heat transfer away from the bearing. The airflow rate will vary as a function of the motor speed. When a motor under high load and RPM reduces speed it follows that the rate of convective airflow generated by the motor fan decreases precisely when the motor is in greater need of increased air flow to reduce heat capacitance in the motor housing. This increases the risk of unacceptable heat buildup in the drive side bearing housing.

Other induction motor designs, such as vertical shaft motors have constructed lubricant wells to provide a pool of oil surrounding the bearing and housing. Some vertical motors have incorporated auxiliary oil/air heat exchangers to assist oil cooling. Yet other hermetically enclosed motors have incorporated phase-changing chlorofluorocarbon liquid refrigerants sprays on bearing housings. However these cooling solutions are not practically applicable to horizontal shaft induction TEFC motors in typical industrial applications.

With respect to vented housing motors, other attempts have been made in the past to interpose sheet metal air deflectors in the internal motor cavity between the drive side motor bearing and the hotter rotor/stator assemblies so that cooling airflow in the cavity would carry heat away from the bearing housing region. Such shielding could also provide additional thermal resistance to convective heat transfer from the rotor/stator to the bearing. However, during continued motor operation such a shield eventually absorbs motor heat and it in turn radiates heat to the bearing housing. The single-layer partial shield/baffle in effect only provides transient thermal shielding to the bearing until the shield achieves operating temperature.

Thus, a need exists in the art for a motor bearing cooling solution that reduces heat transfer from the motor rotor and stator to the drive side bearing of TEFC motors and other types of electrodynamic machines.

SUMMARY OF THE INVENTION

Accordingly, an object of the invention is to enable cooler running of dynamoelectric machine shaft bearings, including TEFC induction motor drive bearings.

It is another object of the present invention to enable cooler running of dynamoelectric machine shaft bearings in current design TEFC induction motor and other motor drive bearings with minimal re-design and fabrication.

It is another object of the present invention to retrofit currently installed TEFC induction motors and other motors, to enable cooler running of shaft bearings.

These and other objects are achieved in accordance with the present invention by a double-wall induction motor bearing shield that defines an air channel chamber between the shield outer and inner walls. The inner and outer walls may have different heat transfer conductivity, with the outer wall shell having a higher or lower conductivity than the inner shell, depending on the application solution chosen. Conductivity of the respective shell walls may be accomplished through the use of different physical materials (e.g., copper vs. steel) or coatings applied to the shells (e.g., conductivity enhancing vs. insulating coatings) and/or insulating layers. Dead air space within the air channel chamber reduces heat transfer from the outer shell to the inner shell.

Optionally the air channel chamber between the inner and outer shells may be constructed to enable circulating air flow that draws heat away from the motor housing while thermally isolating the bearing housing. In this embodiment of the present invention the heat shield has an intake that is in communication with an air flow source, such as air ducted from a TEFC motor axial cooling fan. Such a circulating air flow chamber also defines an exhaust to provide for air flow circulation within the chamber. In this embodiment the air flow within the chamber transfers heat out of the motor housing, lowering operating temperature within the motor housing. Interposing a zone of relatively cooler air within the chamber between the relatively hotter rotor/stator and the bearing housing also adds an additional heat transfer thermal barrier resistance to maintain relatively cooler insulated temperature in the bearing housing zone. Optional airflow directing vanes may be constructed in the air flow chamber between the inner and outer shells.

The present invention is easily adapted to existing induction motor internal geometries including existing TEFC motor designs, and may be field or shop retrofitted to existing operational motors.

Another aspect of the present invention directs external air flow to the heat shield from an auxiliary air source. The external air source may include a variable speed motor-driven fan and/or a heat exchanger to provide air cooler than ambient temperature to the motor heat shield. The auxiliary air source flow rate, temperature and humidity may be controlled by the motor's drive controller, so that cooling rates are matched to the motor's heat transfer needs that vary with applied load and RPM or in response to changes in motor operating conditions sensed by the controller.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

After considering the following description, those skilled in the art will clearly realize that the teachings of my invention can be readily utilized in a dynamoelectric machine of the present invention.

Figure 1:
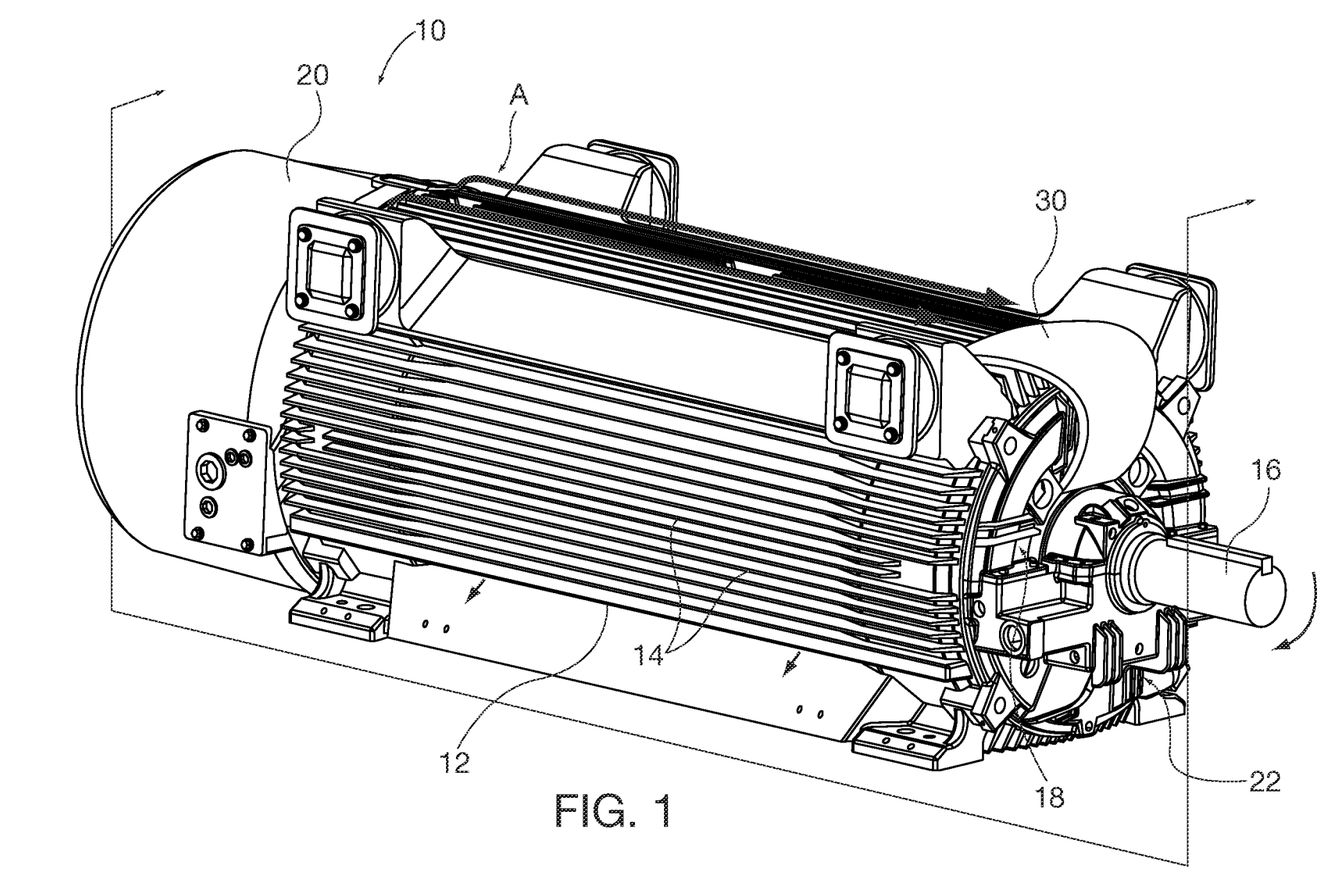
FIG. 1 shows a perspective view of a totally enclosed fan cooled (TEFC) induction motor including the heat shield air deflector duct of the present invention.
Figure 2:
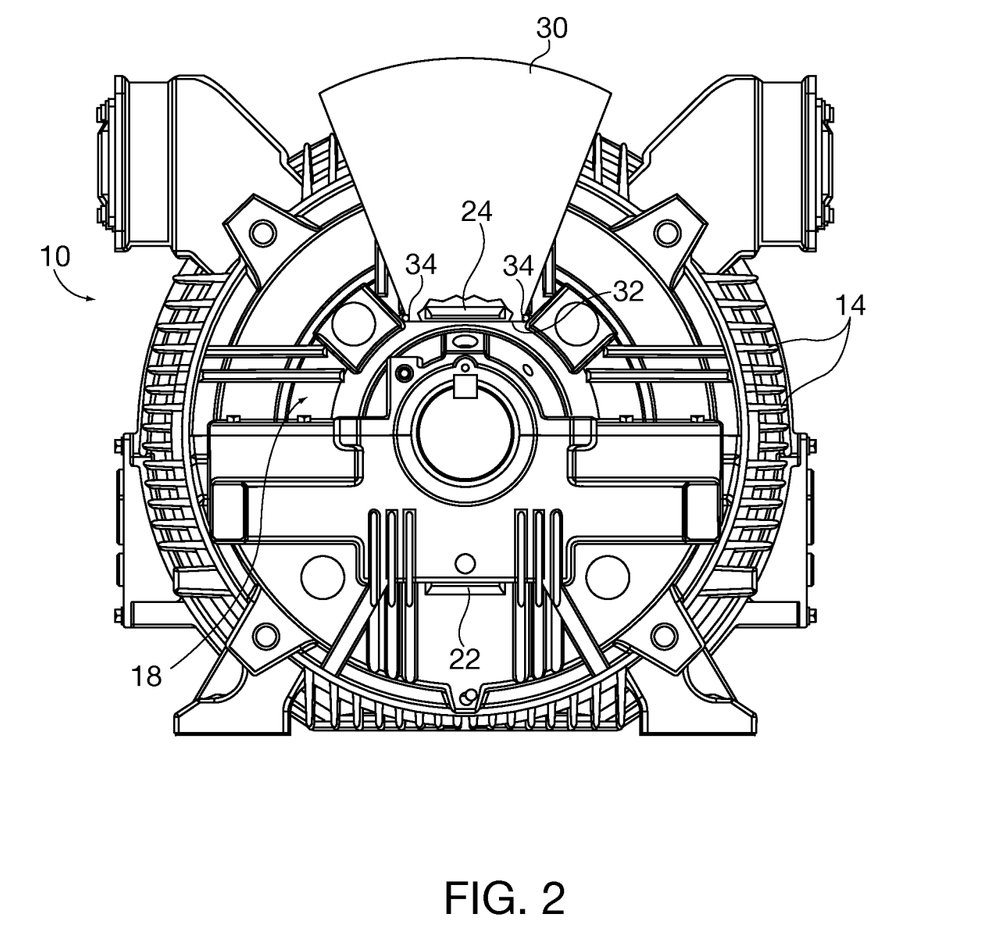
FIG. 2 is an elevational end view of the drive side of the TEFC motor of FIG. 1.
Figure 3:
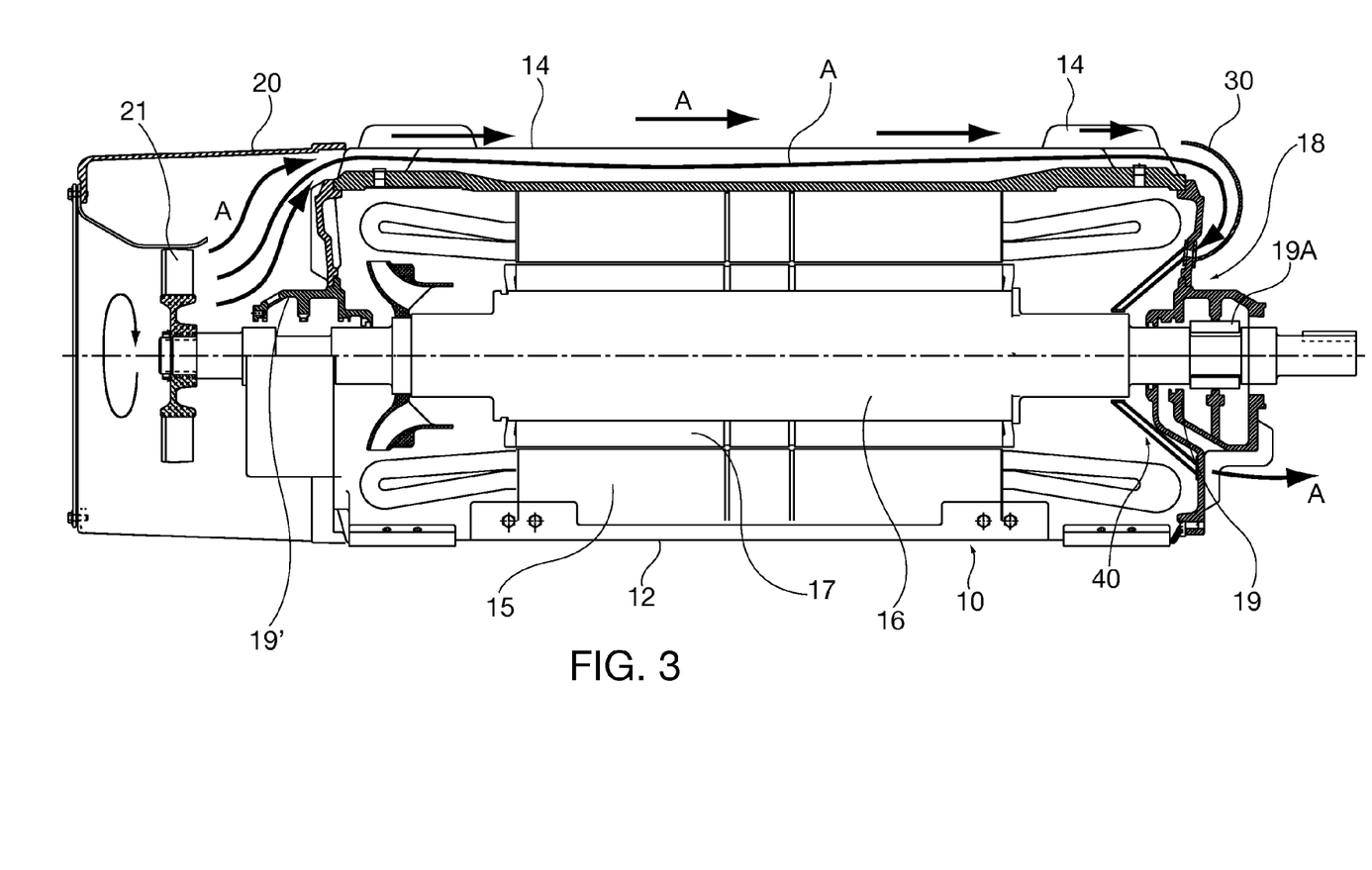
FIG. 3 is an axial cross-sectional view of the motor of FIG. 1 taken along 3-3 thereof.

FIGS. 1-3 show an exemplary TEFC induction motor 10 that incorporates the heat shield of the present invention. The motor 10 has a housing 12 with an array of circumferential axial cooling fins 14. A stator 15 of generally annular profile is retained within the housing 10. A rotating drive shaft 16 and rotor 17 are concentrically mounted within the stator 15 annular bore. Focusing on the drive end of the motor, the right side of FIGS. 1 and 3, the drive shaft 16 is supported by bearing bracket 18 and a similar bracket on the opposite fan side end of the motor. The drive shaft 16 rotates on bearings 19A that are in turn retained in bearing housings 19. The drive end bearing housing is coupled to the bearing bracket 18. The fan shroud 20 directs cooling air flow generated by the drive shaft fan 21 radially outwardly to the housing 12 circumferential periphery and axially generally parallel along the cooling fins 14, as depicted by the exemplary labeled arrows "A". As can be understood by reference to the airflow arrows A, of FIG. 1, it follows that the fan 21 air current blows directly on the fan side bearing housing 19'.

Given the motor 10 construction, it is not possible for the fan 21 to blow on the drive side bearing housing 19 because it is blocked axially by the stator 15 and rotor 17 structures. Construction features of the motor 10 so far described are of conventional, known design. These known features in and of themselves do not provide cooling air circulation to the drive side bearing housing 19 that is otherwise oriented within the relatively hot, sealed confines of the motor housing along with the heat generating stator 15 and rotor 17. Absent the present invention, the drive side bearing housing 19 is subject to all radiant and convective heat flow generated by the stator 15 and rotor 17. The bearing housing 19 in known motor construction is also subject to direct conductive heat transfer from the drive shaft 16, however that transfer is relatively small compared to convective and radiant heat transfer caused by the stator 15 and rotor 17.

Figure 4:
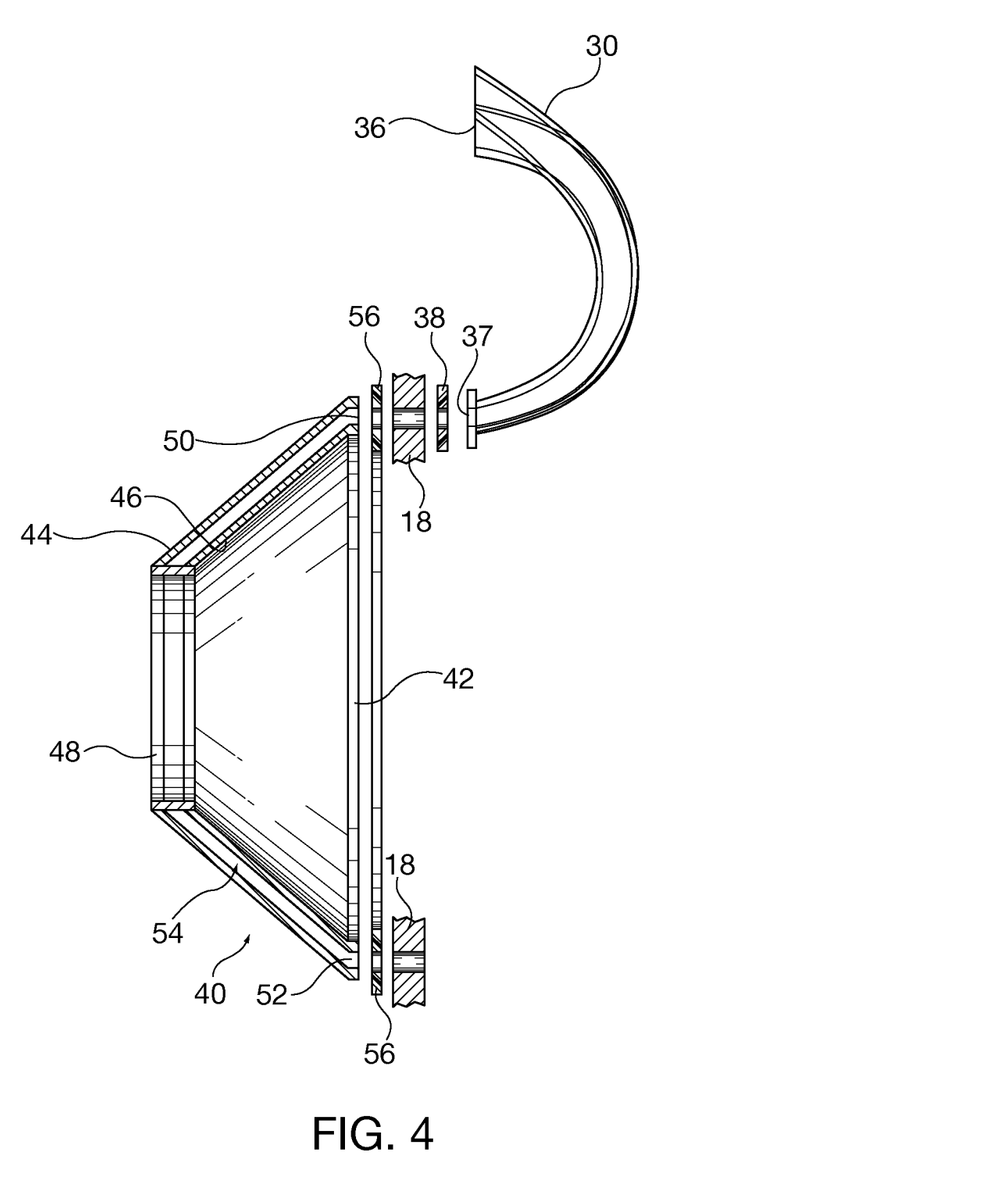
FIG. 4 is an axial cross-sectional view of the heat shield of FIG. 3 without the motor components, in order to show the relative orientation and function of the heat shield components.

Focusing now on FIGS. 2-6, the heat shield 40 of the present invention thermally isolates the drive side bearing housing 19 and bearing 19A from the stator 15 and rotor 17 thermal heat generating sources within the motor housing 12. The heat shield 40 optionally and preferably provides a circulating air heat shunt around the bearing housing when coupled to a circulating air source, such as the air deflector duct 30, described below. Referring to FIG. 4, the heat shield 40 is coupled to drive side bearing bracket 18 as will be described below, and is in fluid communication with an exhaust vent 22 defined by the bearing bracket. An intake vent 24 defined by the bearing bracket 18 is in mutual fluid communication with the heat shield 40 and air deflector duct 30 that pass through the intake vent.

Figure 6:
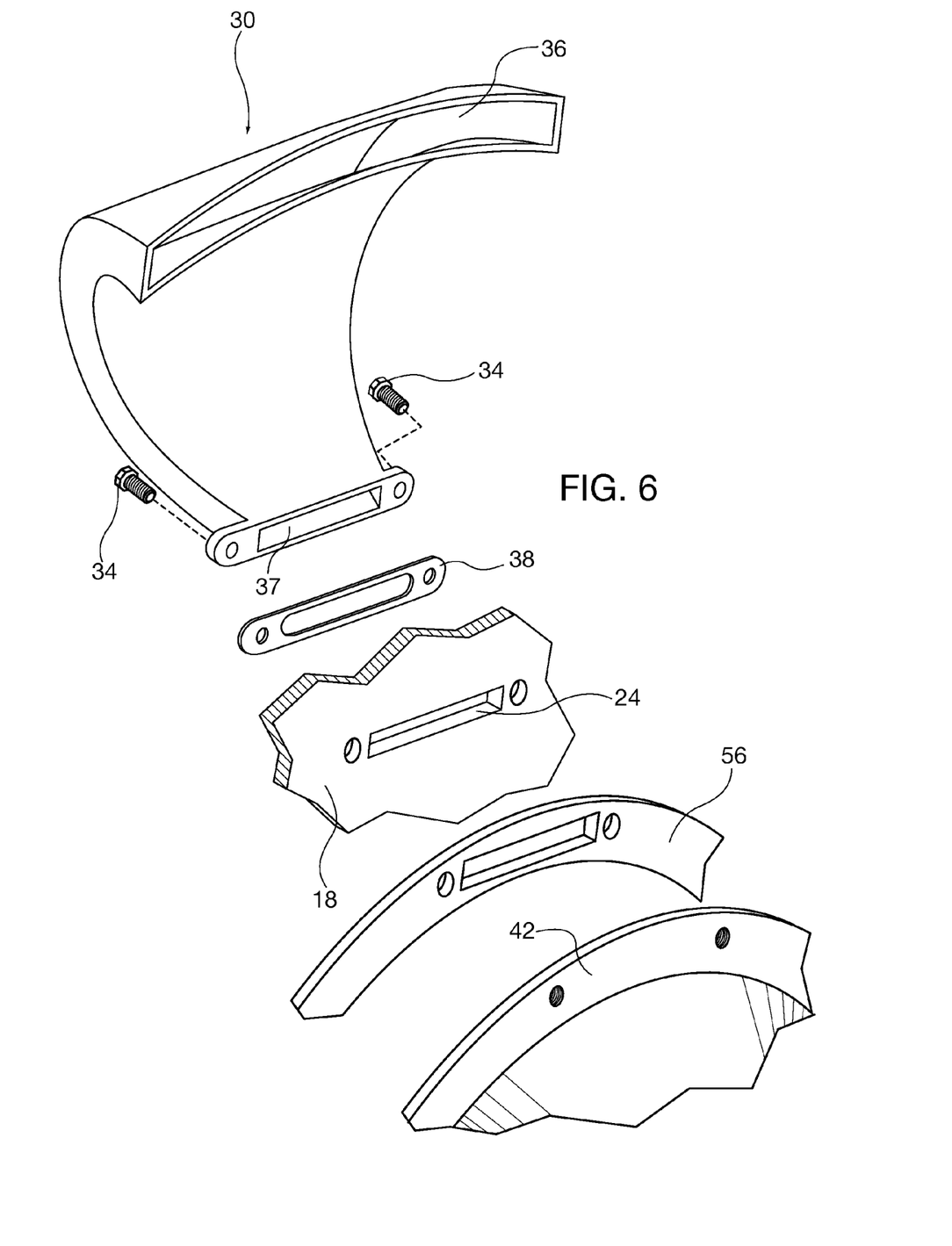
FIG. 6 is a perspective view of the air deflector duct of FIG. 1.

As shown in FIG. 6, air deflector duct 30 has a mounting flange 32 for coupling to the bearing bracket 18 with bolts 34. The duct intake 36 intercepts axial air flow A over a portion of the motor housing 12 fins 14 and diverts the intercepted airflow through duct exhaust 37 that is in communication with the bearing bracket intake vent 24, as shown in FIG. 1. Duct gasket 38, between the duct mounting flange 32 and the bearing bracket 18 inhibits loss of airflow at the juncture of those two mating components.

Figure 5:
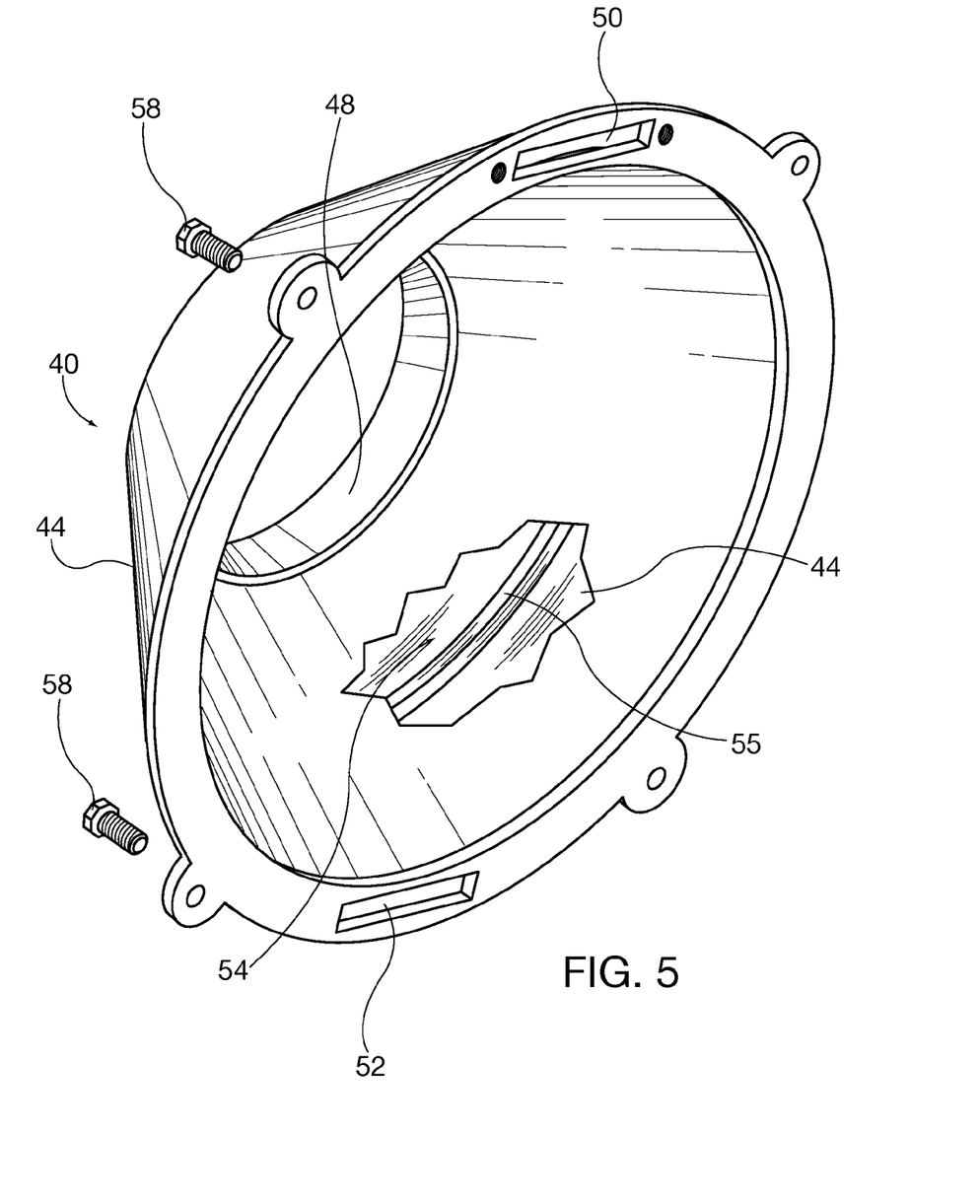
FIG. 5 is a perspective view of the heat shield of FIG. 1 removed from the motor and air deflector duct, showing in cutaway optional air circulation directing vanes formed therein.

Referring to FIGS. 2, 4 and 5, the bearing heat shield 40 of the present invention has a mounting flange 42 that is abutted against the inner face of the bearing bracket 18. The heat shield 40 has an outer shell 44 within which is nested inner shell 46, the exemplary embodiment of which shown in these figures having a frusto-conical profile for ease of fabrication. It should be understood that other profiles can be chosen by those skilled in the art while still practicing the present invention.

Annular flange 48 joins the nested outer 44 and inner 46 shells and receives the drive shaft within the annular bore therein. The annular flange inner bore is constructed to have a diameter approximately 0.125-0.250 inches (3 mm-6 mm) larger than the drive shaft 16 diameter to allow clearance for thermal expansion, vibration and air flow fluctuations. The heat shield 40 outer 44 and inner 46 shells fully envelop and thermally isolate the bearing housing 19 and bearing 19A from heat generated by the stator 15 and rotor 16. Air flow and convective heat transfer through the annular gap between the annular flange 48 and the drive shaft 44 is relatively small in comparison to the total heat generated by the stator 15 and rotor 17, the transfer of which to the drive side bearing housing is effectively attenuated by heat shield 40.

The heat shield 40 inner wall 46 and outer wall 44 may have different heat transfer conductivity properties, with the outer wall shell 44 having a lower conductivity than the inner shell 46, if there is a dead, non-circulating air space between those shells. Dead air space between the inner and outer shells 46, 44 reduces heat transfer from the outer shell to the inner shell. Conversely the outer shell 44 may have a higher conductivity than the inner shell 46 if there is circulating air between the respective shells, as will be described in an alternative, preferred embodiment below. Conductivity of the respective shell walls 44, 46 may be accomplished through the use of different physical materials (e.g., copper vs. steel) or coatings applied to the shells (e.g., conductivity enhancing vs. insulating coatings) and/or insulating layers.

Preferably the heat shield 40 of the present invention incorporates provisions for ambient pressure or higher pressure forced air flow between the outer 44 and inner 46 shells. As shown in FIG. 4, Air channel 54 is a closed frusto-conical annular chamber defined by the spaced opposing inner surfaces of the inner 46 and outer 44 shells, mounting flange 42 and annular flange 48. The heat shield mounting flange 42 defines a shield intake 50 that is in fluid communication with the air deflector duct exhaust 37 through the bearing bracket intake vent 24. The mounting flange 42 also defines a shield exhaust 52 that is in fluid communication with the bearing bracket exhaust vent 22.

The air channel 54 facilitates air flow circulation by receiving circulating air from the deflector duct 30 through the shield intake 50 and expelling air through the shield exhaust 52. Air circulation within the air channel 54 transfers heat from the outer shell 44 that is exposed to the relatively hotter stator 15 and rotor 16. The circulating air within the channel 54 functions as a heat sink for the stator 15 and rotor 17, and thus interposes a functional thermal barrier between the bearing housing 19 and the rest of the motor interior. Optional flow vanes 55 may be constructed within the air channel 54 to direct air flow within the channel. It is also possible to eliminate the annular flange 48 in the heat shield construction as a matter of design choice, recognizing that its elimination will enable additional convective heat transfer from the hotter stator 15 and rotor 17 to the bearing housing and allow air circulation within the air channel 54 to shunt through the gap between the inner 46 and outer 44 shells into the motor housing.

Flange gasket 56 is interposed between the heat shield mounting flange 42 and the bearing bracket 18, effectively preventing convective heat currents in the motor housing generated by the hotter stator 15 and rotor 17 from shunting around the heat shield 40 to the bearing housing 19. The shield bolts 58 couple the heat shield flange 42 to the bearing bracket 18. When the heat shield 40 is coupled to the motor 10 as described, the bearing housing 19 is fully surrounded axially and radially from the remainder of the motor housing 12 components, except the shaft 16 and the relatively small air gap radial clearance that exists between the shaft 16 outer diameter and the annular ring flange 48 inner diameter that surrounds the shaft.

As those skilled in the art will appreciate from the above description and accompanying figures, the heat shield 40 of the present invention envelops and thermally isolates the drive bearing housing 19 and bearing 19A from direct convective and radiant heat generated by the stator 15 and rotor 17 during motor 10 operation. Generally analyzing heat transfer from the heat generating stator 15 and rotor 17 sources to the drive side bearing housing 19, the rotor/stator are the primary heat source that can directly transfer heat convectively and radiantly to the bearing housing as they are all contained in the motor housing 12. The heat shield 40 of the present invention provides a significant thermal barrier to those rotor 17 and stator 15 heat transfer regimes, due to its double shell construction 44, 46. Circulating air within the air channel 54 carries away heat absorbed by the outer shell 44. The shaft 16 is a secondary heat transfer path from the stator 15 and rotor 17 due to its direct connection to the rotor structure, but those skilled in the art can appreciate that this secondary heat transfer path is relatively small compared to the primary direct heating pathways described above. The shaft heat transfer pathway from the shaft 16 to the drive side bearing housing 19 is by direct conductive heating caused by the shaft thermal coupling to the bearing 19 and convective heat transfer from the shaft to the housing. It is noted that the hydrodynamic oil film interposed between the shaft 16 journal surface and the mating bearing 19 provides a relatively high thermal resistance to direct conduct heat transfer. Circulating oil forming the oil film also carries away heat. Likewise convective heat transfer from the shaft 16 to the bearing housing is attenuated by the air gap between those components.

Figure 7:
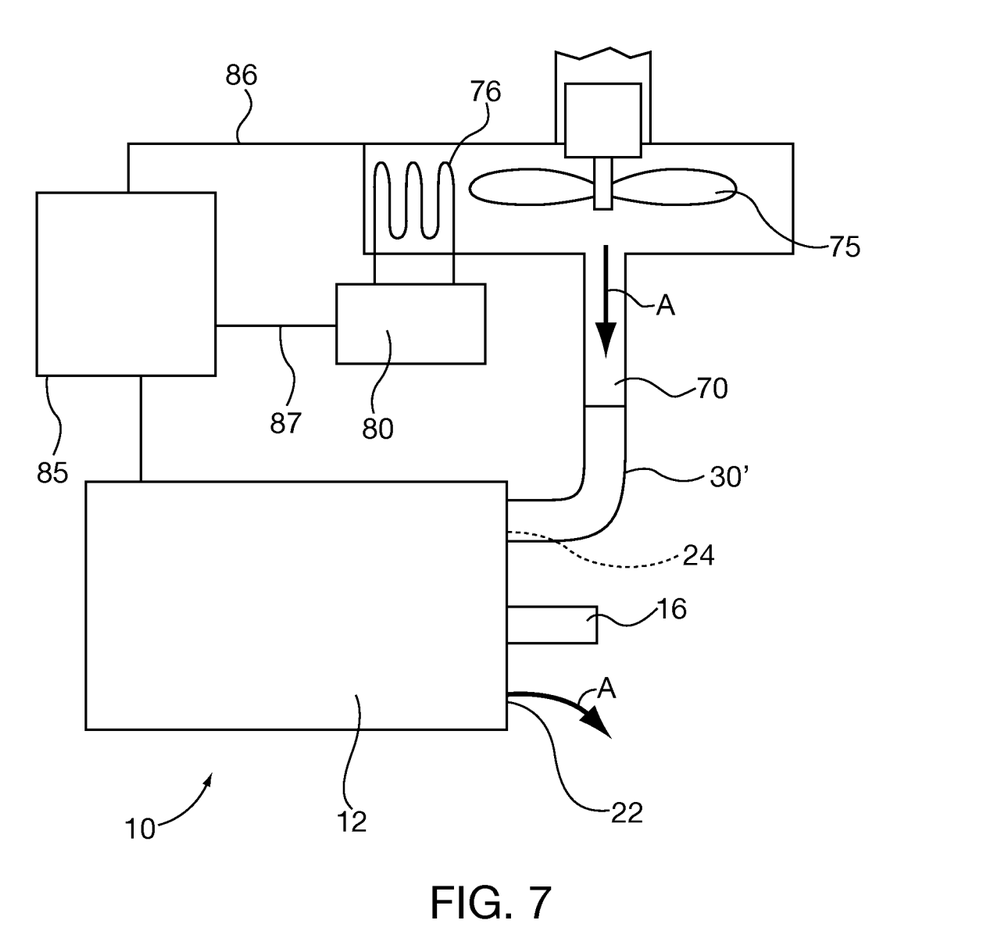
FIG. 7 is a schematic view of the heat shield of FIG. 1 coupled to an auxiliary cooling fan and heat exchanger that are controlled by a motor drive control.

In the embodiments shown in FIGS. 1-6, the source of circulating air for the TEFC motor 10 heat shield 40 is the axial fan 21, as deflected by the fan shroud 20 and air deflector duct 30 into the shield intake 50. It is possible to feed other circulating air sources into the shield intake 50, as shown schematically in FIG. 7. An external air source duct 70 is coupled to air deflector duct 30' that in turn is coupled to the shield intake 50. The shield 40 structure is constructed and operates as previously described. The external duct 70 air flow source is depicted by arrows A. The external duct 70 may be coupled to a single or variable speed fan 75 and heat exchanger 76 that is in turn coupled to a cooling unit 80. The fan 75 and heat exchanger 76 that can vary the air flow source A temperature, humidity content and flow rate. A known motor drive controller 85 coupled to the motor 10 controls motor operating speed and power generation, among other things. The motor controller 85 in turn controls the fan via communications pathway 86 and the cooling unit 80 via communications pathway 87, so that the motor controller can selectively vary circulating air A flow rate, temperature and humidity, as well as other known parameters, in response to changing motor operating conditions established or sensed by the controller. For example, the controller 85 may issue preset operational commands to the fan 75 and cooling unit 80 when it causes the motor 10 to change operating parameters (e.g., change speed or load). The controller 85 may also issue responsive operational commands to the fan 75 and cooling unit 80 in reaction to motor operating condition changes sensed by the controller (e.g., motor bearing oil or motor housing 12 temperatures exceeding thresholds).

While various embodiments of the invention have been shown and described herein, those skilled in the art will appreciate that changes and modifications may be made without departing from the spirit and scope of the invention as set forth in the accompanying claims.

What is claimed is:

1. In a dynamoelectric machine having a machine housing including therein a shaft rotatable within at least one bearing housing mounted in a bearing bracket of the machine housing, a bearing heat shield comprising:
   nested, spaced apart outer and inner shells, both extending radially from the bearing bracket of the machine housing to the shaft, defining an air channel cavity therebetween that completely envelop and thermally isolate the bearing housing from thermal communication with the remainder of the machine housing interior;
   an annular flange receiving the shaft therein; and
   a heat shield flange for coupling to the bearing bracket of the machine housing, both flanges being coupled to the inner and outer shells.

2. In a dynamoelectric machine having a machine housing including therein a shaft rotatable within at least one bearing housing mounted in a bearing bracket of the machine housing, a bearing heat shield comprising:
   nested, spaced apart outer and inner shells, both extending radially from the housing to the shaft, defining an air channel cavity therebetween that completely envelop and thermally isolate the bearing housing from thermal communication with the remainder of the machine housing interior; wherein the inner and outer shells have different heat conductive properties.

3. The bearing heat shield of claim 1, further comprising a respective shield intake and exhaust coupled to the machine housing bearing bracket, both in communication with the air channel, the shield intake for receiving circulating air flow into the air channel and the shield exhaust for expelling air flow from the air channel.

4. The bearing heat shield of claim 3, further comprising an air deflector duct in fluid communication with the shield intake for routing air flow to the air channel.

5. The bearing heat shield of claim 4 further comprising a variable speed fan in fluid communication with the air deflector duct for selectively varying air flow rate into the air channel.

6. The bearing heat shield of claim 5 further comprising a heat exchanger in thermal communication with the air deflector duct for selectively varying air flow temperature into the air channel.

7. The bearing heat shield of claim 3, further comprising airflow directing vanes defined within the air channel.

8. In a dynamoelectric machine having a housing including therein a shaft rotatable within at least one bearing housing mounted in a bearing bracket of the machine housing, a bearing heat shield comprising:
- nested, spaced apart outer and inner shells, both extending radially from the housing to the shaft, defining an air channel cavity therebetween that completely envelop and thermally isolate the bearing housing from thermal communication with the remainder of the machine housing interior;
- an annular flange receiving the shaft therein and a heat shield flange for coupling to the bearing bracket of the machine housing, both flanges being coupled to the inner and outer shells;
- a respective shield intake and exhaust defined by the heat shield flange, both in communication with the air channel, the shield intake for receiving circulating air flow into the air channel and the shield exhaust for expelling air flow from the air channel; and
- an air deflector duct in fluid communication with the shield intake for routing air flow to the air channel.

9. An induction motor comprising:
a motor housing including therein:
- a generally annular stator;
- a rotor oriented within the stator;
- a rotatable shaft coupled to the rotor;
- at least one bearing housing enabling rotation of the shaft therein coupled to a bearing bracket of the motor housing;
- a bearing heat shield having nested, spaced apart outer and inner shells defining an air channel cavity therebetween that completely envelop and thermally isolate the bearing housing from thermal communication with the remainder of the motor housing interior; and
- an annular flange receiving the shaft therein and a heat shield flange for coupling to the bearing bracket of the motor housing, both flanges being coupled to the inner and outer shells.

10. The induction motor of claim 9, wherein the bearing heat shield further comprises:
- a respective shield intake and exhaust both in communication with the air channel, the shield intake for receiving circulating air flow into the air channel and the shield exhaust for expelling air flow from the air channel.

11. The induction motor of claim 10, further comprising: an air deflector duct in fluid communication with the shield intake for routing air flow to the air channel.

12. The induction motor of claim 11, further comprising: a variable speed fan in fluid communication with the air deflector duct for selectively varying air flow rate into the air channel.

13. The induction motor of claim 11, further comprising: a heat exchanger in thermal communication with the air deflector duct for selectively varying air flow temperature into the air channel.

14. The induction motor of claim 11, wherein the motor is a totally enclosed fan cooled induction motor having a fan coupled to the shaft, in fluid communication with the air deflector duct, for generating air flow into the heat shield air channel.

15. The induction motor of claim 9, wherein:
- the motor is a totally enclosed fan cooled induction motor having a fan coupled to the shaft for generating air flow to the motor housing, and has a drive side bearing bracket that defines bearing bracket intake and exhaust vents;
- the bearing heat shield further comprises:
  - a respective shield intake and exhaust defined by the heat shield flange, both in communication with the air channel, the shield intake in direct fluid communication with bearing bracket intake vent, for receiving circulating air flow into the air channel, and the shield exhaust in direct communication with the bearing bracket exhaust vent, for expelling air flow from the air channel; and
  - an air deflector duct in fluid communication with the shield intake and the fan for routing air flow generated by the fan to the air channel.

\* \* \* \* \*